United States Patent [19]

Derckx

[11] 4,208,437

[45] Jun. 17, 1980

[54] METHOD FOR MAKING CONFECTIONERY LOLLIPOPS

[76] Inventor: Henricus A. J. M. Derckx, 31 St. Antoniusstraat, Weert, Netherlands

[21] Appl. No.: 930,122

[22] Filed: Aug. 1, 1978

Related U.S. Application Data

[62] Division of Ser. No. 852,002, Nov. 15, 1977, Pat. No. 4,168,139.

[30] Foreign Application Priority Data

Nov. 25, 1976 [NL] Netherlands ...................... 7613131

[51] Int. Cl.² .......................... A23G 3/00; A23G 3/12
[52] U.S. Cl. .................................. 426/134; 426/660; 426/512
[58] Field of Search .............. 426/134, 249, 660, 512; 425/126 S, 116, 233–237, 353, 240

[56] References Cited

U.S. PATENT DOCUMENTS

| 816,374 | 3/1906 | Pratt | 425/353 X |
|---|---|---|---|
| 1,057,231 | 3/1913 | Frischmann | 425/240 |
| 1,364,590 | 1/1921 | Sharpe | 425/240 X |
| 1,487,788 | 3/1924 | Lombardo et al. | 425/116 |
| 1,692,559 | 11/1928 | Miller | 425/126 S |
| 2,287,675 | 6/1942 | Fair et al. | 425/353 X |
| 2,534,678 | 12/1950 | Obermann et al. | 425/116 X |
| 2,660,963 | 12/1953 | Covert et al. | 425/126 S X |
| 3,958,018 | 5/1976 | Tay | 426/660 |

FOREIGN PATENT DOCUMENTS

| 6410108 | 3/1965 | Netherlands | 425/126 S |
|---|---|---|---|
| 523677 | 8/1972 | U.S.S.R. | 425/240 |

*Primary Examiner*—Jeanette M. Hunter
*Attorney, Agent, or Firm*—Ladas, Parry, Von Gehr, Goldsmith & Deschamps

[57] ABSTRACT

In order to make higher production speeds possible when making confectionery lollipops a method and a device are presented wherein the separation of the pieces of confectionery takes place by means of a cutting stamp making an up and down movement in the vertical plane and, each time, a piece of confectionery is transferred to a production head in which a partially inserted stick is present already and in which the piece of confectionery is prepressed, whereupon the stick is inserted further into the piece of confectionery during a rotation of the production head to a second position in which, by means of a pressing stamp moving to and fro in radial direction, the subsequent pressing of the lollipops takes place, the production head being rotated thereupon again over a distance to a position in which the lollipop is ejected from the production head.

3 Claims, 9 Drawing Figures

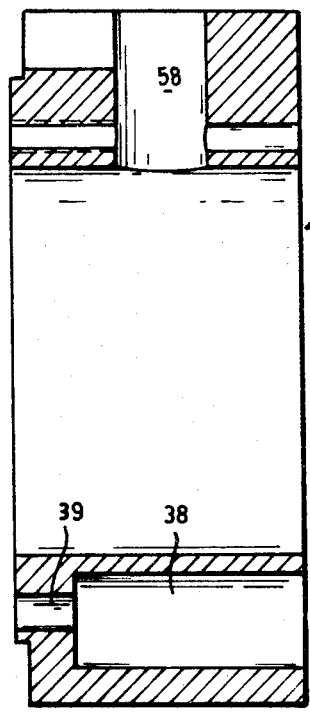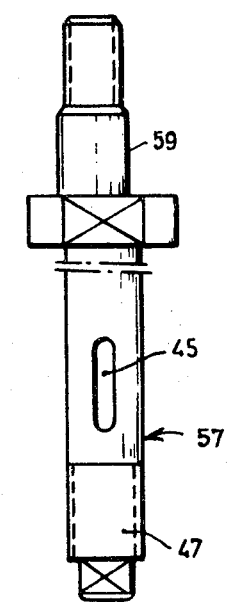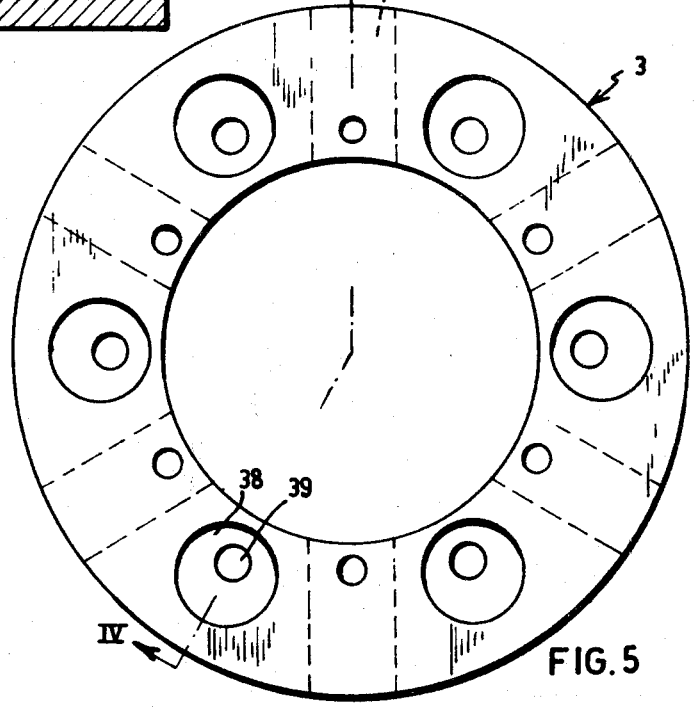

METHOD FOR MAKING CONFECTIONERY LOLLIPOPS

This is a divisional of co-pending application Ser. No. 852,002 filed Nov. 15, 1977, now U.S. Pat. No. 4,168,139 granted Sept. 18, 1979.

The invention relates to a method for making confectionery lollipops consisting of supplying a strand of confectionery, separating pieces of confectionery from the strand, prepressing the pieces of confectionery, supplying of small sticks and inserting the sticks into the prepressed pieces of confectionery, and subsequently pressing the stick-provided pieces of confectionery lollipops and the further conveying of the lollipops.

The most elementary method for making confectionery lollipops consists of supplying a strand of confectionery into a moulding cavity, cutting a small piece from the confectionery strand by a lower stamp moving through a cylinder, which lower stamp presses the piece of confectionery against an upper stamp, whereupon these stamps move together to a supply station for the sticks. At the supply station a stick is inserted, and the second or upper stamp then starts to move quicker so that the cutting stamp or lower stamp is able to press the lollipop from the cylinder. With this method a production speed of 120 confectionery lollipops per minute is possible.

Higher production speeds are possible using the teaching of Netherlands Pat. No. 91,633 in which the strand of confectionery is supplied in tangential direction to a drum, and the pressing of the confectionery lollipops takes place by means of moulding dies which are slidable in a direction parallel to the centre line of the drum. Herewith a production speed of 1000 confectionery lollipops per minute is possible.

Still higher production speeds are possible with a method as described in Netherlands Pat. application 64 10108 but the device which is to be used for such a method is very complicated, because, e.g., separate cutting stamps are necessary to subdivide the strand of confectionery into pieces. Consequently, the number of moving parts is very great, it being especially noticeable that the upper cutting stamps have to move along with the drum. Should it be desired to adapt such a device to make lollipops of another appearance, therefore, a very great number of parts will have to be replaced. Here, consequently, it is important to be able to make the device with as few moving parts as possible and to be able to have the separation of pieces of confectionery from the sugar stand take place quickly without being obliged required, e.g. to rely on the influence of gravity, because dependence on gravity would restrict the production speed too much.

According to the invention there is provided a method of making confectionery lollipops, which comprises inserting small sticks into respective recesses in a rotary production head; delivering confectionery in the form of a strand to a cutting position; causing a cutting stamp mounted at the cutting position to execute repeated up and down movements thereby to cut pieces of confectionery from the strand upon successive downward movements and to transfer the pieces of confectionery to respective recesses of the production head, whereby the pieces of confectionery are provided with respective partially-inserted sticks and are pre-pressed; rotating the production head to bring the recesses containing the pieces of confectionery in succession from the cutting position to a pressing position and, upon such rotation, inserting the sticks further into the pieces of confectionery; causing a pressing stamp mounted at the pressing position to execute repeated to and fro movements with respect to the production head and to enter the recesses respectively upon successive movements towards the production head thereby to press the pieces of confectionery in the recesses and form lollipops; rotating the production head to bring the recesses containing the lollipops in succession from the pressing position to a discharge position; and ejecting the lollipops from the recesses at the discharge position.

Preferably the production head each time rotates through an angle of 60° and the subsequent pressing of the pieces of confectionery takes place with the center line of the pressing stamp disposed at an angle of about 120° to the center line of the cutting stamp, it also being preferred that the position in which the lollipop is ejected from the production head is in the vicinity of the vertical plane in which the separation of the pieces of confectionery took place.

The invention will be elucidated herebelow by means of the drawing in which, by way of example, an embodiment of a device for making confectionery lollipops is represented. In the drawing:

FIG. 4 is a section on the line IV-IV of the cylindrical body of FIG. 5;

FIG. 5 is a view in the direction of the arrow A according to FIG. 4;

FIG. 8 is a view of one of the eccentric shafts which can be used together with the frame of FIGS. 6 and 7 and FIG. 9 is a view, for the greater part in section, on the line IX—IX of FIG. 2 in which a detail is represented of the member for the adjustment of the pressing force of the cutting stamp which member can be used also by the pressing stamp.

The invention will first be elucidated roughly by way of FIGS. 1-3, whereupon subsequently details of the construction of the device for the application of the method will be elaborated further.

Figure 1:
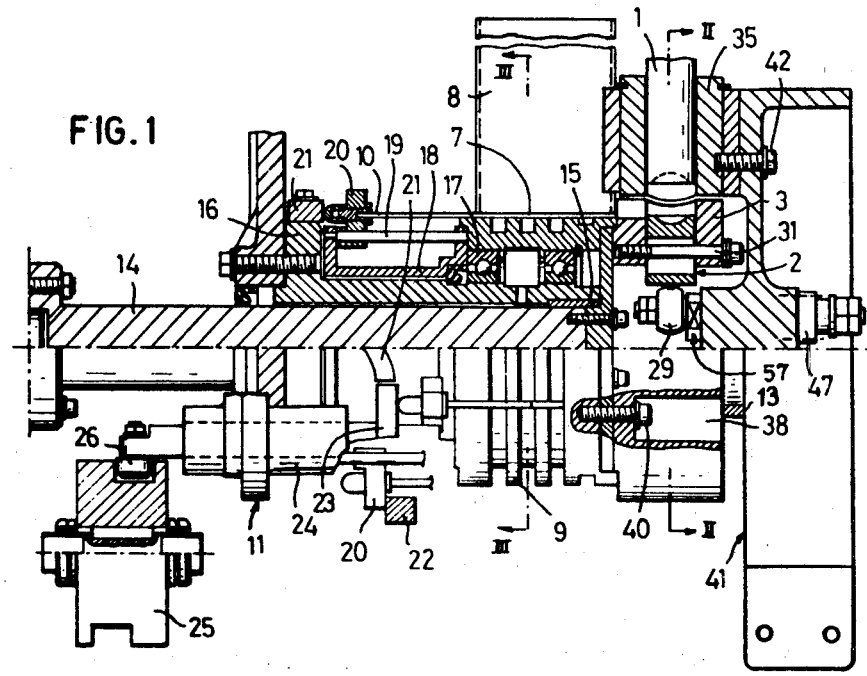
FIG. 1 is a longitudinal section of the essential parts of a device for making confectionery lollipops according to the method of the invention.
Figure 2:
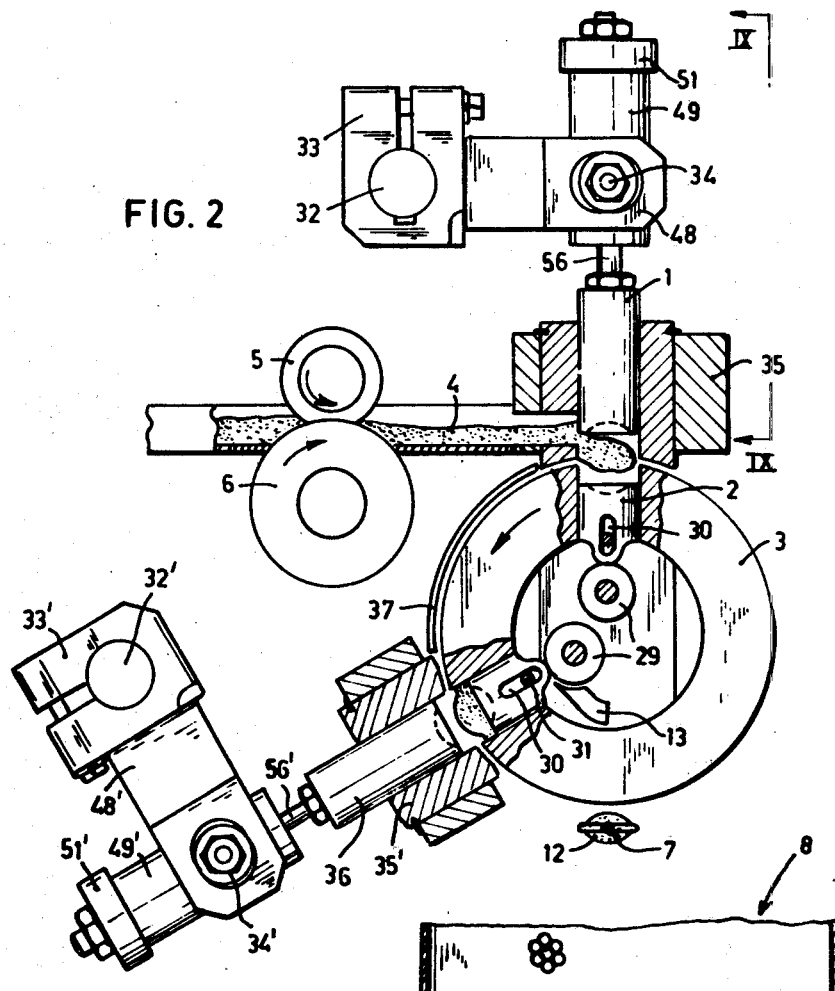
FIG. 2 is a section on the line II—II of FIG. 1.

FIGS. 1 and 2 illustrate a cutting stamp 1 which is located at a cutting position to which a strand of confectionery 4 is supplied, in the manner shown in FIG. 2, between upper and lower equalizing rolls 5 and 6. The stamp 1 is movable towards a lower stamp 2 which is situated in a cylindrical body 3, and a piece of confectionery is cut off from the strand of confectionery 4 during this movement of the lower stamp 2. The confronting surfaces of the stamps 1 and 2 are hollowed out as indicated in dotted lines to for the piece of confectionery in the finally desired shape. The stamps 1 and 2 have a circular section in this embodiment, but the invention can be used also with other cross sections. The cutting stamp 1 is attached to a fastening block 33, it being possible that provision is made for the accurate adjustment of the height position of the stamp and the force the stamp can exert on the confectionery during the combined cutting off and prepressing and subsequent pressing.

Figure 3:
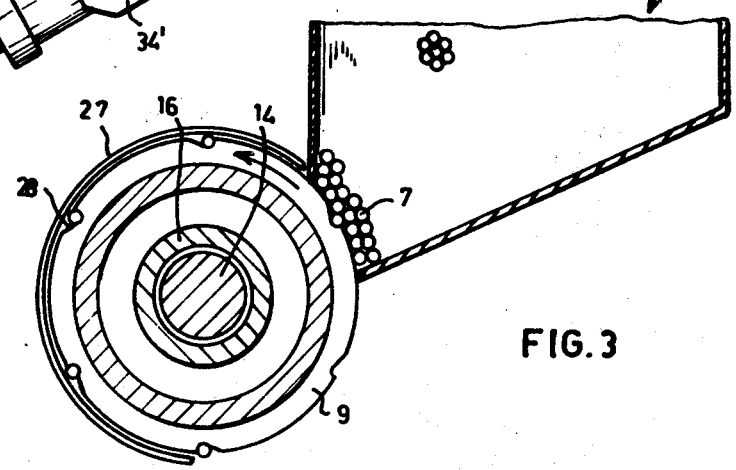
FIG. 3 is a section on the line III—III of FIG. 1.

In FIGS. 1 and 3 the supply of sticks 7 is illustrated. A stock of these sticks is present in a stick box 8 which is located in such a way that a stick drum 9 which is fixedly connected with the cylindrical body 3 can provide for giving the correct direction of movement to these sticks. The peripheral grooves of the stick drum 9 have the sole purpose of saving weight, which is not unimportant in the case of rapidly intermittently driven parts. The sticks are moved by a pin 10 in such a way that during the cutting off of the piece of confectionery they already extend a few millemeters into the confectionery; during the rotation towards the pressing position the insertion depth increases in a way to be further elucidated herebelow and in the subsequent pressing position additional insertion takes place with the depression member 11 diagrammatically represented in FIG. 1.

Furthermore, it appears from FIG. 2 that the finished lollipops 12 are ejected from the cylindrical body 3 at the lower side by virtue of the lower stamps being pressed outwards by a conduction curve 13 supported by a frame 41 during their rotation with the body 3. Also a member may be provided exerting a small push in downward direction onto the stick in order to guarantee that the finished lollipop is rapidly received in its entirety by the discharge member. With the high production speeds that are desired, the influence of gravity cannot be relied on.

In the illustrated device, the cylindrical body 3 rotates through an angle of 120° during the cutting and the subsequent pressing. In principle, however, there could be question also of a smaller angle of, e.g. 90° but what is essential is that the cutting off, prepressing and subsequent pressing takes place in radial direction in respect of the longitudinal centre line of the cylindrical body.

Now further attention will be paid, by way of FIG. 1, to the construction and drive of the production head.

A driving shaft 14 is connected with the outlet of a (not represented) driving member and is caused to rotate thereby. The driving shaft 14 rotates in a bearing box which is positioned in a stationary cylindrical bracket 16. At the exterior surface of this bracket 16 are bearings 17 which rotatably support the stick drum 9. The stick drum 9 is further connected with a bearing ring 18 carrying guide pines 19 for the guiding of tabs 20 which abut a stick pin curve 21 which is positioned on the bracket 16. This bracket also carries a fetch back curve 22 which returns the tabs 20 and their respective pins 10 to the initial position. At a position between the curves 21 and 22 corresponding with the position of subsequent pressing of the pieces of confectionery and in this case, consequently, 120° after the cutting off thereof, a depression cam 23 of the depression member 11 is provided. This cam is movable to and fro in a sleeve 24, being driven by a roll 26 which is located in an inclined groove formed in a rotatably driven groove ring 25. The stick drum 9 is formed with receiving grooves 28 which extend longitudinally of the stick drum. Adjacent receiving grooves are spaced apart from each other about the drum by an angle of 60°. Preferably, the receiving grooves are bevelled at their leading edges, as shown in FIG. 3, to ensure that each groove takes up one stick as the groove passes the stick box 8. FIG. 3 also shows that a stick guide 27 is provided to insure that the sticks 7 remain in the receiving grooves 28 from the cutting position up to the moment that the finished lollipops are discharged from the production head.

In FIGS. 1 and 2 the pressure rolls 29 are represented which bring the lower stamps 2 into the correct position in the cylindrical body 3 in the cutting position and the subsequent pressing position. The lower stamps have grooves 30 in which studs 31 are located which define the extreme positions in radial direction which can be occupied by the lower stamps, particularly during mounting.

The cutting stamp 1 is driven by a shaft 32 which rotates alternately in opposite directions. A fastening block 33 is positioned on the shaft and moves the cutting stamp up and down in a stamp sleeve 35 by means of a fork-shaped lever 48 and pivot connection 34. A pressing stamp 36 moves in a similar way through a stamp sleeve 35' under the influence of a fork-shaped lever 48' with a pivot connection 34' and a fastening block 33'. Between the two stamp sleeves 35 and 35' a protective cap 37 is positioned as an additional safeguard against the flying outwards of the pieces of confectionery under the influence of the centrifugal force. Since the rectilinear movement of the upper stamps 1 and 36 is derived from and oscillatory rotating movement of the levers 48 and 48' around the shafts 32 and 32', each time that the cylindrical body stops again after a rotation of 60°, the pivot connections 34 and 34' are provided, as shown in FIG. 2, with elongate holes. Further details of the drive of the upper stamps will be reverted to later in the description of FIG. 9.

The cylindrical body 3 is also illustrated in FIGS. 4 and 5, FIG. 4 being a section on the line IV—IV in FIG. 5. In the view of FIG. 5 six recesses 38 are shown having holes 39 through which bolts 40 (FIG. 1) can be inserted to connect the cylindrical body 3 and the stick drum 9 together. This provides the possibility for a rapid exchange for another cylindrical body when lollipops having another diameter are to be produced. In FIG. 5, furthermore, the six stamp holes 58 are represented in which provisions are made, as indicated in FIG. 4, to allow location of the studs 31.

Figures 6, 7:
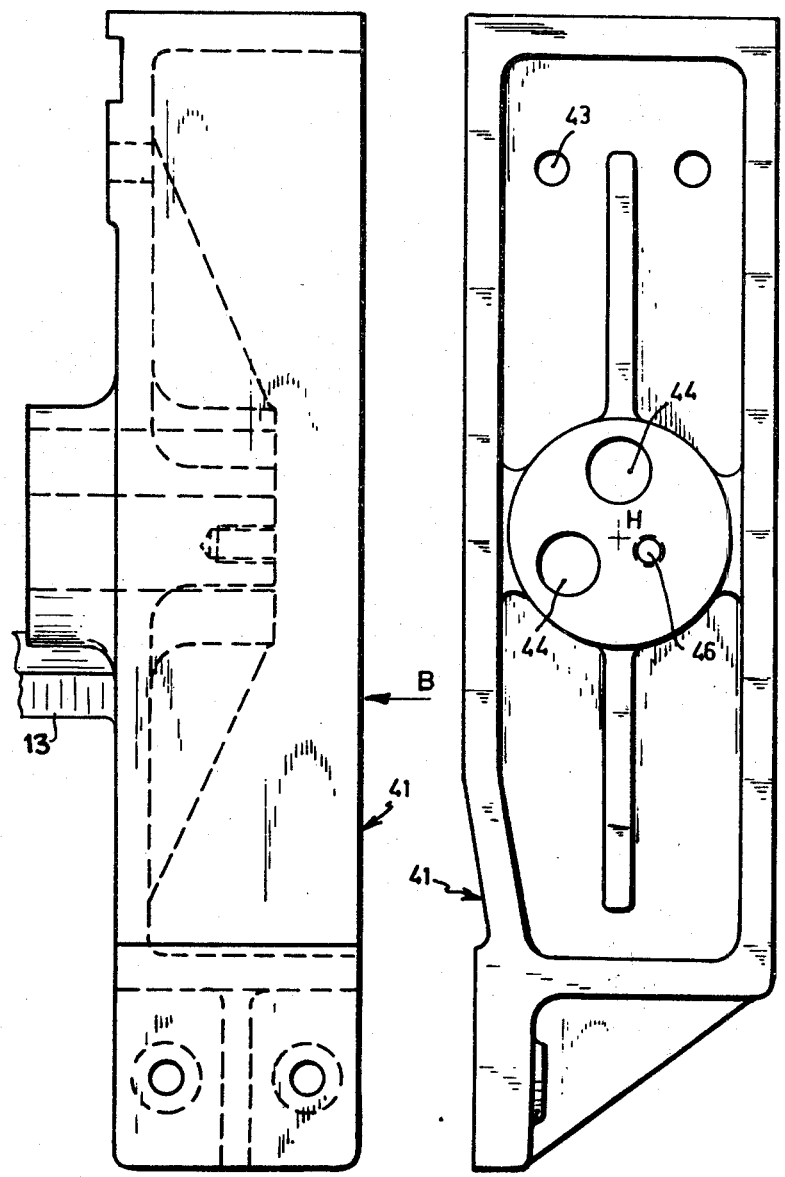
FIG. 6 is a side view of the frame for the adjustment of the lower stamps.
FIG. 7 is a view in the direction of the arrow B of FIG. 6.

The position of the pressure rolls 29, and consequently the position of the lower stamps 2, can be adjusted with the mechanism to be elucidated herebelow by way of FIGS. 6–8, which mechanism mainly consists of a frame 41 which is stationarily positioned and connected by bolts 42 inserted in holes 43 (FIG. 7) with the stamp sleeve 35 of the cutting stamp 1 (FIG. 1). Of more importance are the bores 44 in FIG. 7, the centres of which are offset from each other about the centre point H of the frame by an angle of 120° which angle corresponds with the angle between the centre lines of the cutting and pressing stamps. Through these bores extend adjusting shafts 57 with eccentric parts 59, represented in detail in FIG. 8, on which the pressing rolls 29 are positioned. Pinions 47 (FIG. 1) are fitted on the adjusting shafts 57 and are keyed thereto by means of a keyway 45 (FIG. 8). The pinions 47 are collectively adjusted by a toothed wheel (not shown) the shaft of which is fitted in a threaded bore 46 (FIG. 7).

The drive of the various parts of the device takes place by making use of a distribution box, but this belongs to the known state of the art and, therefore, will not be elucidated further.

Figure 9:
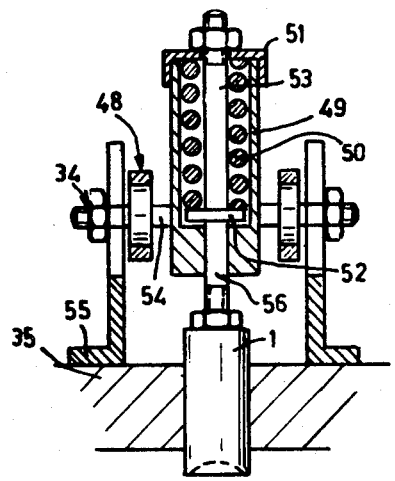

The way in which the pressing force of the upper stamps 1 and 36 can be adjusted will be further described with reference to the stamp 1 and FIG. 9, which shows spring cylinder 49 incorporated between the pivot connections 34 and the cutting stamp 1. In the spring cylinder is a spring 50 which can be given a longer or shorter extension by means of a cylinder lid 51 which is adjustable with respect to the cylinder. A rod 53 is positioned within the spring 50 and provided with a shoulder 52. The rod 53 is connected with the stamp 1 by means of a screw connection which also has the result that when changing to the production of lollipops of other dimensions only a few parts are to be replaced. In order to achieve a favourable directing of the force applied to the stamp 1 giving as little risk as possible of jamming of the pressing stamp, it further is desirable to guide the shaft 54 additionally rectilinearly in supports 55 provided with guide slots located at both sides on the stamp box 35. The position of the rod 53 with respect to the stamp 1 is adjustable by virtue of the fact that the rod 53 is provided with a screw thread portion 56 which can be screwed into and out of the stamp. Adjustment of the pressing force is achieved by rotation of the lid 51 with respect to the spring cylinder 49.

It will be clear that by way of the illustrated device, which is characterized by the need to replace only a few parts when different lollipops are to be produced in a subsequent phase of production, a great technical advance has been achieved over e.g., the device according to U.S. Pat. No. 2,637,281, which latter device only has a production speed of about 200 confectionery lollipops per minute and in which for the reconstruction of the device in order to make lollipops of another shape twelve dies, twelve upper stamps and twelve lower stamps are to be replaced.

Within the scope of the following claims other embodiments than elucidated above are also comprised, it being possible to mention, as a very important variant, the case that the centre line of the cutting stamp makes a small acute angle with a perpendicular situated in the vertical plane.

What is claimed is:

1. A method of making confectionery lollipops, which comprises inserting small sticks into respective recesses in a rotary production head; delivering confectionery in the form of a strand to a cutting position; causing a cutting stamp mounted to the cutting position to execute repeated up and down movements thereby to cut pieces of confectionery from the strand upon successive downward movements and to transfer the pieces of confectionery to respective recesses of the production head, whereby the pieces of confectionery are provided with respective partially-inserted sticks and are prepressed; rotating the production head to bring the recesses containing the pieces of confectionery in succession from the cutting position to a pressing position and, upon such rotation, inserting the sticks further into the pieces of confectionery; causing a pressing stamp mounted at the pressing position to execute repeated to and fro movements with respect to the production head and to enter the recesses respectively upon successive movements towards the production head thereby to press the pieces of confectionery in the recesses and form lollipops; rotating the production head to bring the recesses containing the lollipops in succession from the pressing position to a discharge position; and ejecting the lollipops from the recesses at the discharge position.

2. A method as claimed in claim 1, wherein the rotary production head rotates in steps of 60° and the pressing position is spaced from the cutting position by an angle of 120° about the axis of rotation of the production head.

3. A method as claimed in claim 1 or 2, wherein the discharge position is spaced from the cutting position by an angle of 180° about the axis of rotation of the production head.

* * * * *